Nov. 9, 1926.

A. ROELOFS

CULINARY SIGNAL UTENSIL

Filed April 14, 1925

INVENTOR.
Andrew Roelofs
BY
ATTORNEYS.

Patented Nov. 9, 1926.

1,606,449

UNITED STATES PATENT OFFICE.

ANDREW ROELOFS, OF NEW YORK, N. Y.

CULINARY SIGNAL UTENSIL.

Application filed April 14, 1925. Serial No. 23,060.

This invention relates to improvements in culinary utensils, and more particularly in boilers, and it is the principal object of my invention to provide a boiler top equipped with means for automatically indicating the fact that the contents of the boiler are about to boil over.

Another object of the invention is the provision of acoustic signalling means for indicating the boiling of the contents of a boiler or the like.

A further object of the invention is the provision of exchangeable acoustic signals for boilers to indicate by a whistling sound the boiling of the contents of the boiler.

These and other objects and advantages of my invention will become more fully known as the description thereof proceeds, and will then be specifically pointed out in the appended claims.

In the accompanying drawing, forming a material part of this disclosure:

Figure 1:
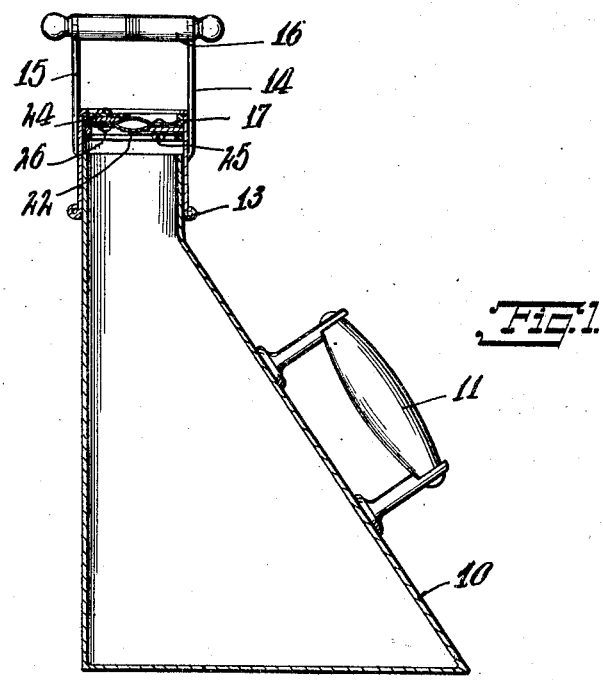
Fig. 1 is a sectional side elevation of a boiler having a top equipped with the acoustic signalling device constructed according to my invention.
Figure 2:
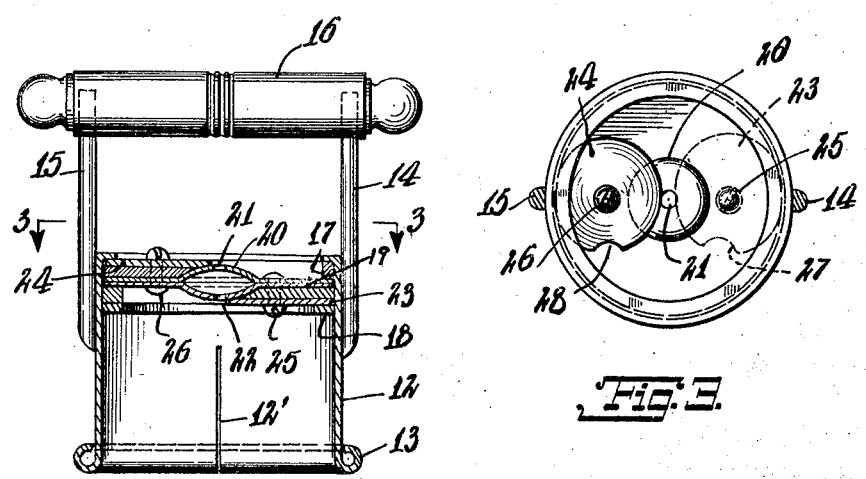
Fig. 2 is a sectional side elevation of a top on an enlarged scale.
Figure 3:
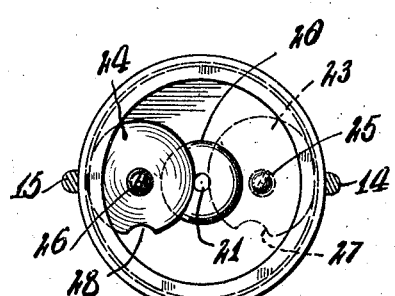
Fig. 3 is a cross-section on line 3—3 of Fig. 2.

A vessel 10 of any suitable shape and material, for instance as shown, of substantial triangular shape for facilitating the pouring out of its contents, has a handle 11 attached to one of its sides. The top of the vessel is closed by a cover 12, slotted as at 12′, and having a lower flange or bead 13, and attached thereto the bars 14 and 15 which are connected at their upper ends by a handle bar 16 made of heat insulating material.

The cover 12 has an upper inner flange 17 and a lower inner flange 18 spaced therefrom.

Between the two flanges a membrane 19 is held having a convex-concave central diaphragm member 20, provided with an upper opening 21 and a lower opening 22 in approximately the middle thereof in alignment, and one of these openings is preferably wider than the other. Pairwise arranged cam-discs 23, 24 are exchangeably secured by headed bolts 25 and 26 to the diaphragm member 20 and have rounded recesses 27 and 28 in their margins allowing a change in the width of the opening 21 and 22 to change the tone of the whistling sound produced by the escaping steam or vapor passing from the vessel to the atmosphere.

It will be clear that the cam discs may be exchanged to allow a change in the width of the openings and may be secured either to the lower face of the diaphragm disc or to the upper face, if desired.

The operation of the device will be entirely clear from the above description and it is to be understood that such changes may be made in the preferred form illustrated in the drawing, such as fall within the scope of the appended claim without departure from the spirit of my invention.

Having thus described my invention what I claim as new, and desire to secure by Letters Patent, is:

In a cooking utensil of substantial triangular shape having a restricted neck part, a handle, a slitted and flanged cover for the utensil adapted to snugly engage said neck, a diaphragm held between the flanges of said cover, and having a perforated convex-concave central member, cam faces having recesses adapted to be secured on top and below said diaphragm and adapted to increase and decrease the width of the openings therein for changing the whistling sound made by the steam escaping from the utensil through the perforations in the diaphragm to give an acoustic alarm.

In testimony whereof I have affixed my signature.

ANDREW ROELOFS.